(12) United States Patent
Kurth

(10) Patent No.: US 8,100,408 B2
(45) Date of Patent: Jan. 24, 2012

(54) SEALING ELEMENT

(75) Inventor: Jürgen Kurth, Odenthal (DE)

(73) Assignee: Aktiebolaget SKF, Gothenburg (SE)

( * ) Notice: Subject to any disclaimer, the term of this patent is extended or adjusted under 35 U.S.C. 154(b) by 765 days.

(21) Appl. No.: 12/106,916

(22) Filed: Apr. 21, 2008

(65) Prior Publication Data

US 2008/0265520 A1 Oct. 30, 2008

(30) Foreign Application Priority Data

Apr. 21, 2007 (DE) .......................... 10 2007 019 006

(51) Int. Cl.
*F16J 15/32* (2006.01)

(52) U.S. Cl. ........................................ 277/572; 277/549

(58) Field of Classification Search .................. 277/549, 277/569, 572, 573
See application file for complete search history.

(56) References Cited

U.S. PATENT DOCUMENTS

| | | | | |
|---|---|---|---|---|
| 2,631,906 A * | 3/1953 | Brock | ........................... | 277/555 |
| 2,867,457 A * | 1/1959 | Riesing et al. | ................. | 277/562 |
| 3,168,319 A * | 2/1965 | Paulsen | .......................... | 277/433 |
| 6,322,082 B1 * | 11/2001 | Paykin | ........................... | 277/549 |
| 6,601,855 B1 * | 8/2003 | Clark | ............................. | 277/549 |
| 6,811,102 B2 | 11/2004 | Krause et al. | | |
| 7,261,246 B2 | 8/2007 | Krause et al. | | |
| 2002/0162538 A1 | 11/2002 | Krause et al. | | |
| 2003/0006563 A1 * | 1/2003 | Cater et al. | ..................... | 277/549 |
| 2005/0016501 A1 | 1/2005 | Krause et al. | | |
| 2005/0046115 A1 * | 3/2005 | Yokoyama et al. | ........... | 277/549 |

FOREIGN PATENT DOCUMENTS

DE 100 27 662 A1 12/2001

* cited by examiner

*Primary Examiner* — Gilbert Lee
(74) *Attorney, Agent, or Firm* — Buchanan Ingersoll & Rooney PC

(57) ABSTRACT

A sealing element is provided for placement between first and second components, wherein the first component includes a cylindrical cavity with a step-shaped shoulder which narrows the cavity, and the second component is a cylindrical component for placement in the cavity. The sealing element comprises a stiffening body with a L-shaped longitudinal cut surface, with the first leg of the L shape being provided extending between the jackets of the cavity and of the second component, and the second leg being provided essentially in the region of the shoulder extending between the two components and at least in partial regions for touching the shoulder and the end side of the second component. The sealing element also comprises a sealing body which is made integrally continuous with a first sealing region for contact with the peripheral surface of the outside jacket of the second component and with a second sealing region for contact with an annularly peripheral region on the end surface of the shoulder of the first component.

21 Claims, 1 Drawing Sheet

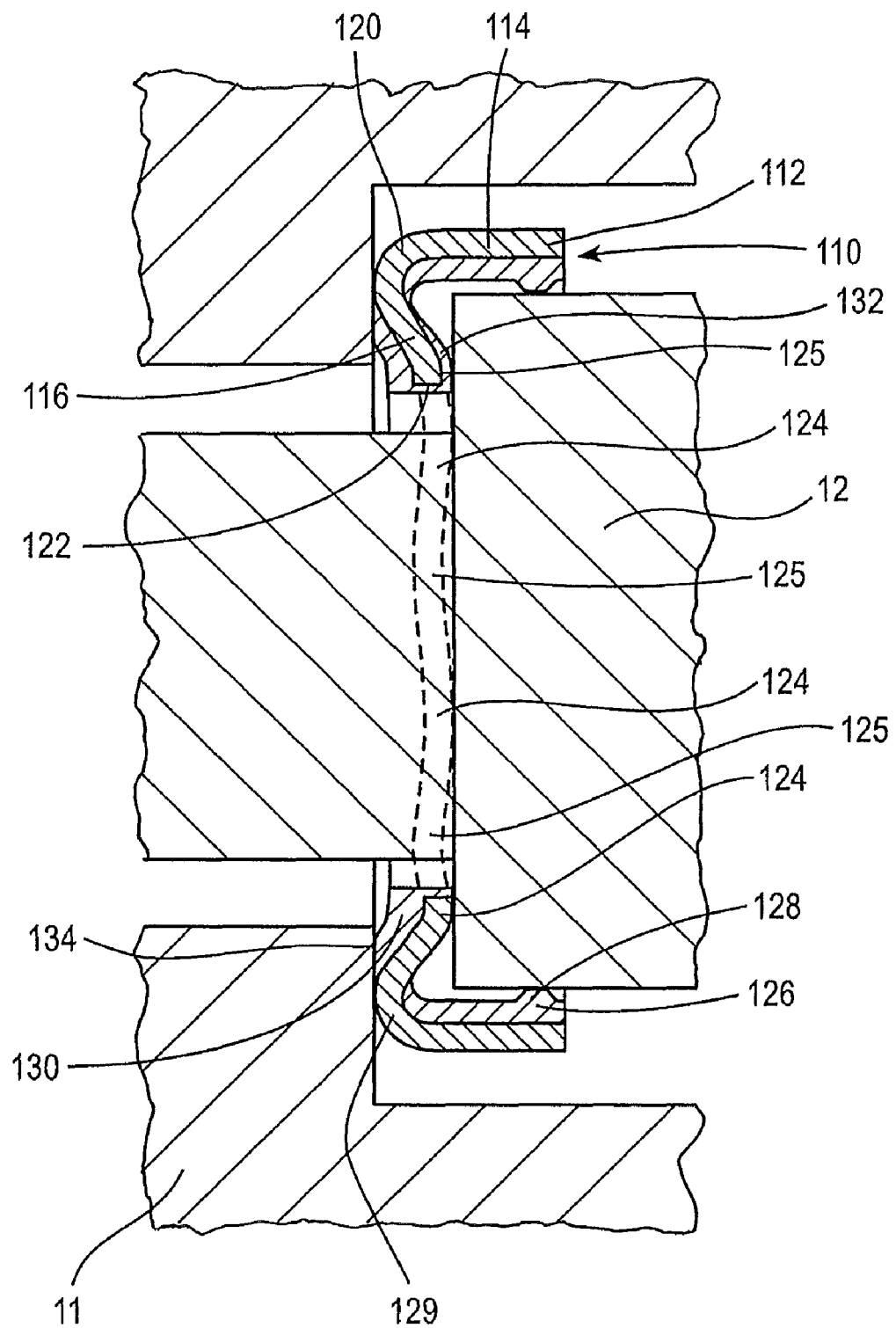

SEALING ELEMENT

This application is based on and claims priority under 35 U.S.C. §119(a) with respect to German Application No. 10 2007 019 006.0 filed on Apr. 21, 2007, the entire content of which is incorporated herein by reference.

TECHNOLOGICAL FIELD

The invention disclosed here generally relates to a sealing element. More specifically, the subject matter disclosed here pertains to a sealing element for placement between a first and a second component, wherein the first component comprises a cylindrical cavity with a step-like shoulder which narrows the cavity, and wherein a second cylindrically made component is adapted to be placed in the cavity.

BACKGROUND DISCUSSION

DE 100 27 662 A1 discloses an example of a sealing device for a fuel injection valve which can be inserted into the receiving hole of the cylinder head of an internal combustion engine for direct injection of fuel into the combustion space of the internal combustion engine. In this connection, the sealing device has a sealing element which peripherally surrounds the nozzle body of the fuel injection valve, and encompasses a base body which has an axial recess through which the nozzle body extends. The base body furthermore has an annular depression which is connected to the recess and into which the sealing element is placed. The base body with a first contact surface at least indirectly adjoins the end surface of the fuel injection valve, and with a second contact surface which is opposite the first contact surface at least indirectly adjoins the step of the receiving hole.

SUMMARY

A sealing element is provided for placement between a first and a second component, with the first component comprising a cylindrical cavity with a step-like shoulder which narrows the cavity, and with the second component being a cylindrical component for placement in the cavity. The sealing element comprises a stiffening body with a L-shaped longitudinal cut surface, the first leg of the L, shape being provided extending between the jackets of the cavity and of the second component, and the second leg being provided in the region of the shoulder extending between the two components and at least in partial regions for touching the shoulder and the end side of the second component. The sealing element comprises a sealing body which is made integrally continuous with a first sealing region for contact with the peripheral surface of the outside jacket of the second component and with a second sealing region for contact with an annularly peripheral region on the end surface of the shoulder of the first component.

With this construction of the sealing element, the sealing body can be manufactured more easily and moreover can be more easily attached to the stiffening element so that production costs can be reduced.

In other aspects of the sealing element, the stiffening bodies are made to directly touch the shoulder and the end side of the second component, with the stiffening body between the contact region on the shoulder and the contact region on the end side of the second component being made with a spring function in the axial direction. Thus it is advantageously possible to resiliently lay the second component in the cavity of the first component.

The annularly peripheral region of the second sealing region of the sealing body is spaced radially to the contact region of the stiffening body on the shoulder, and especially is located within the indicated contact region. Thus pretensioning applied to the components is transferred in large part, preferably solely, by the stiffening element, by which unfavorable settling or creep behaviors of the sealing material especially in the second sealing region are inhibited or precluded.

In one preferred embodiment, the ring disk-like region of the stiffening element in the region of the second leg is profiled on its inner edge in the axial direction by depressions and elevations, and the first and the second sealing region of the sealing body are interconnected by webs which encompass the second leg in the region of the depressions. In this way the second component can tightly adjoin the elevations of the stiffening element elastically pretensioned. The connection between the first and the second sealing region then takes place by the webs which run between the second component and the stiffening element in the region of the depressions and which ensure the integral execution of the sealing body and thus also its capacity to be produced in a single injection molding process.

One embodiment is especially preferred in which the profiling is undulatory. In order to help ensure a secure seat of the second component with reference to the stiffening element, the undulatory profiling has at least three elevations.

Preferably, the sealing body is made of, or consists of, an elastomer, with the sealing body being produced for example in a single injection molding process. The sealing body can thus be economically produced in large numbers.

Likewise, for these reasons, i.e. for purposes of economical production which at the same time also allows large numbers, the stiffening element is made of, or consists of, a resilient metal sheet and is made for example from punched, bent sheet metal.

BRIEF DESCRIPTION OF THE DRAWING FIGURE

The foregoing and additional aspects of the sealing element disclosed here will become more apparent from the following detailed description considered with reference to the accompanying drawing FIGURE which is cross-sectional view of the sealing element.

DETAILED DESCRIPTION

Referring to the drawing FIGURE, the sealing element 110 disclosed here is shown in a lengthwise cross-section. The sealing element 110 is located between a first component 11 and a second component 12. The first component 11 can be, for example, the cylinder head of an internal combustion engine and the second component 12 can be a fuel injection valve.

The sealing element 110 has a ring-shaped stiffening element 112 encompassing a L-shaped longitudinal cut surface, with a cylinder or cylindrical segment 114 and a flange 116 extending to the inside. By way of example, the stiffening element 112 is made of a resilient metal sheet and is produced by punching. The cylinder segment 114 passes, or merges, into the flange 116 via a bending radius 120. To hold the second component 12, a center opening is provided which is bordered by the inner edge 122 of the flange 116.

The flange 116 is profiled on its inner edge 122 in the axial direction by elevations 124 and depressions 125. In the embodiment illustrated in the drawing FIGURE, undulatory profiling is shown for which the elevations 124 consist of wave peaks and the depressions 125 consist of wave troughs. The undulatory profiling of the flange 116 is indicated by a broken line in the drawing FIGURE.

To seal between the stiffening element 112 and the peripheral surface of the second component 12, the inwardly facing (radially inwardly facing) side of the cylinder segment 114 is provided with a first sealing region 126. For this purpose, the first sealing region 126 includes a projection 128 forming a type of radially peripheral sealing lip.

To seal the stiffening element 112 relative to the first component 11, the flange 116 on its side facing away from the first sealing region 126 is provided with a second sealing region 130. In this connection, to seal the stiffening element 112 relative to the first component 11 and thus the two components 11 and 12 against one another, the second sealing region 130 is provided with an axial projection 134 which runs peripherally and which forms a type of sealing lip.

The first and the second sealing region 126, 130 are made as integral sealing bodies. For this purpose, webs 132 encompass the flange 116 and its inner edge 122 and thus connect the first sealing region 126 to the second sealing region 130. The webs 132 are however provided only in the region of the depressions 125 so that the shoulder of the second component 12 can tightly adjoin the elevations 124, with which the two components 11 and 12 can be resiliently pretensioned against one another via the shoulder 129 of the stiffening element 112.

Since the webs 132 with the first sealing region 126 and the second sealing region 130 which are connected thereto encompass the flange 116, the first sealing region 126 and the second sealing region 130 are securely held on the stiffening element 112, with which the sealing body which consists for example of an elastomer can be advantageously produced in a single injection molding process.

The principles, preferred embodiment and other disclosed aspects of the antifriction bearing for pivoting support of an axle or journal have been described in the foregoing specification. However, the invention which is intended to be protected is not to be construed as limited to the particular embodiment and variations disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Sealing element in combination with a first component and a second component, the first component comprising a cylindrical cavity with a step-shaped shoulder defined by an axially extending inner peripheral surface intersecting an end surface, the step-shaped shoulder providing a narrowed portion of the cavity, the second component comprising a cylindrically-shaped component positioned in the cavity, the sealing element comprising:

a stiffening body with an L-shaped cross-sectional surface, the L-shape comprising a first leg and a second leg, the first leg of the L-shape being positioned between an outer peripheral surface of the second component and an inner peripheral surface of the cavity; the inner peripheral surface of the cavity, the outer peripheral surface of the second component and an outer peripheral surface of the second leg being provided in a region of the shoulder extending between the first and second components, the stiffening body, at least in partial regions, touches the shoulder and an end side of the second component; and a sealing body made integrally continuous with a first sealing region that contacts the outer peripheral surface of the second component and with a second sealing region that contacts an annularly peripheral region on the end surface of the shoulder of the first component.

2. Sealing element in combination with the first component and the second component as recited in claim 1, wherein the stiffening body directly touches the shoulder of the first component.

3. Sealing element in combination with the first component and the second component as recited in claim 1, wherein the second leg possesses an inner edge, the second leg being profiled at least on its inner edge in an axial direction by depressions and elevations, and the first and the second sealing regions of the sealing body are interconnected by webs encompassing the second leg in a region of the depressions.

4. Sealing element in combination with the first component and the second component as recited in claim 3, wherein the profiling is undulatory.

5. Sealing element in combination with the first component and the second component as recited in claim 4, wherein the undulatory profiling has at least three elevations.

6. Sealing element for placement between a first and a second component, the first component comprising a cylindrical cavity with a step-shaped shoulder which narrows the cavity, the second component comprising a cylindrically made component for placement in the cavity, the sealing element comprising a stiffening body with an L-shaped longitudinal cut surface, a first leg of the L shape configured to extend between peripheries of the cavity and of the second component, and a second leg of the L shape configured to be positioned in a region of the shoulder extending between the first and second components the stiffening body, at least in partial regions, is configured to touch the shoulder and an end side of the second component, the sealing element also comprising a sealing body which is made integrally continuous with a first sealing region for contact with the peripheral surface of the second component and with a second sealing region for contact with an annularly peripheral region on an end surface of the shoulder of the first component.

7. Sealing element according to claim 6, wherein the stiffening body is adapted to directly touch the shoulder and/or the end side of the second component.

8. Sealing element according to claim 6, wherein a portion of the stiffening body adapted to be positioned between a contact region on the shoulder and a contact region on the end side of the second component is configured with a spring function in an axial direction.

9. Sealing element according to claim 6, wherein an annularly peripheral region of the second sealing region of the sealing body is adapted to be spaced radially to a contact region of the stiffening body on the shoulder.

10. Sealing element according to claim 6, wherein an annularly peripheral region of the second sealing region of the sealing body is located radially within a contact region of the stiffening body that is adapted to contact on the shoulder.

11. Sealing element according to claim 6, wherein in an unloaded state of the sealing element, an annularly peripheral region of the second sealing region of the sealing body is adapted to project axially in the direction to the shoulder over a contact region of the stiffening body that is configured to contact on the shoulder.

12. Sealing element according to claim 6, wherein the second leg is profiled at least on its inner edge in an axial direction by depressions and elevations, and the first and the second sealing region of the sealing body are interconnected by webs which encompass the second leg in the region of depressions.

13. Sealing element according to claim 12, wherein the profiling is undulatory.

14. Sealing element according to claim 13, wherein the undulatory profiling has at least three elevations.

15. Sealing element according to claim 6, wherein the first sealing region is made with a radially peripheral projection which protrudes radially inwardly.

16. Sealing element according to claim 6, wherein the second sealing region is made with a radially peripheral, axially protruding projection.

17. Sealing element according to claim 6, wherein the sealing body is made of an elastomer.

18. Sealing element according to claim 6, wherein the sealing body is produced in a single injection molding process.

19. Sealing element according to claim 6, wherein the stiffening element is made from a metal sheet.

20. Sealing element according to claim 6, wherein the stiffening element is produced from a punched, bent sheet.

21. Sealing element in combination with a first component and a cylindrically-shaped second component, the first component comprising a cylindrically-shaped cavity having a first surface and a second surface, the second component comprising an outer surface and an end surface, wherein the second component is positioned in the cavity of the first component so the first surface of the cavity faces the outer surface of the second component, and the second surface of the cavity faces the end surface of the second component, the sealing element comprising:
  a stiffening body with an L-shaped cross-section formed by a first leg and a second leg, wherein the first leg is positioned between the outer surface of the second component and the first surface of the cavity, and the second leg is positioned between the end surface of the second component and the second surface of the cavity, the stiffening body, at least in partial regions, touching the second surface of the cavity and the end surface of the second component; and
  a sealing body having a first sealing region and a second sealing region, wherein the first sealing region contacts the outer surface of the second component, and the second sealing region contacts the second surface of the cavity.

* * * * *